US008687659B2

(12) United States Patent
Ahmad et al.

(10) Patent No.: US 8,687,659 B2
(45) Date of Patent: Apr. 1, 2014

(54) ALL-OPTICAL GENERATION OF 60 GHZ MILLIMETER WAVE USING MULTIPLE WAVELENGTH BRILLOUIN-ERBIUM FIBER LASER

(75) Inventors: Asmahanim bte Ahmad, Selangor Darul Ehsan (MY); Mohamed Razman bin Yahya, Bandar Baru Bangi (MY); Syamsuri bin Yaakob, Kuala Lumpur (MY); Mohd Adzir Mahdi, Selangor Darul Ehsan (MY); Romli Mohamad, Selangor Darul Ehsan (MY); Abdullah bin Man, Selangor Darul Ehsan (MY); Muhammad Zamsuri bin Abdul Kadir, Selangor Darul Ehsan (MY); Yu Gang Shee, Selangor Darul Ehsan (MY)

(73) Assignee: Telekom Malaysia Berhad, Kuala Lumpur (MY)

( * ) Notice: Subject to any disclaimer, the term of this patent is extended or adjusted under 35 U.S.C. 154(b) by 33 days.

(21) Appl. No.: 13/634,581

(22) PCT Filed: Nov. 15, 2010

(86) PCT No.: PCT/MY2010/000210
§ 371 (c)(1),
(2), (4) Date: Sep. 13, 2012

(87) PCT Pub. No.: WO2012/050418
PCT Pub. Date: Apr. 19, 2012

(65) Prior Publication Data
US 2013/0010819 A1    Jan. 10, 2013

(51) Int. Cl.
*H01S 3/30*       (2006.01)

(52) U.S. Cl.
USPC ............ 372/6; 372/72; 372/75; 372/94

(58) Field of Classification Search
CPC ............ H01S 3/094015; H01S 3/094023; H01S 3/094084; H01S 3/097088; H01S 3/10007; H01S 3/10023; H01S 3/108; H01S 3/1086; H01S 3/30; H01S 3/302; H01S 5/0064; H01S 5/141
USPC ............................. 372/6, 72, 75, 94
See application file for complete search history.

(56) References Cited

U.S. PATENT DOCUMENTS

| | | | | |
|---|---|---|---|---|
| 6,424,664 | B1 * | 7/2002 | Oh et al. ........................ | 372/6 |
| 7,167,614 | B2 * | 1/2007 | Mangir et al. ................. | 385/27 |
| 2003/0142392 | A1 * | 7/2003 | Strutz et al. ................. | 359/337.2 |
| 2004/0086019 | A1 * | 5/2004 | Kim et al. ..................... | 372/94 |
| 2004/0109224 | A1 * | 6/2004 | Kim et al. ..................... | 359/337.5 |

OTHER PUBLICATIONS

Shee et al. ("All-optical generation of a 21 GHz microwave carrier by incorporating a double-Brillouin frequency shifter," Optics Letters, vol. 35, No. 9, May 1, 2010, p. 1461-p. 1463).*

* cited by examiner

*Primary Examiner* — Yuanda Zhang
(74) *Attorney, Agent, or Firm* — Wenderoth, Lind & Ponack, L.L.P.

(57) ABSTRACT

A system (100) for generating a millimeter wave signals from heterodyning wavelengths from a multi-wavelength signal generated by a Brillouin-Erbium fiber laser (101). The Brillouin-Erbium fiber laser (101) includes a source laser (105) that transmits a seed signal. An optical directional coupler (110) has a first input that receives the seed signal from the source laser and a first output. An Erbium doped fiber amplifier (115) has an input connected to the first output of the optical directional coupler and an output. The Erbium doped fiber amplifier amplifies the seed signal. A four port circulator (120) has a first port that receives the seed signal from the Erbium doped fiber amplifier. A Brillouin gain medium (135) is connected to a second port and a third port of the circulator. The seed signal propagates through the Brillouin gain medium in a first direction and a first order Stokes signal propagates through the Brillouin gain medium in a second direction to generate a second order Stokes signal propagating in the first direction. A fourth port of the circulator is connected to a second input of the optical directional coupler. The optical directional coupler receives the signal from the fourth port of the circulator and outputs a portion of the signal to a first output and a second portion to a second output of the optical directional coupler. Two wavelengths from the second output are then received by a photodiode (150) that heterodynes the signal to generate a millimeter wave signal.

17 Claims, 6 Drawing Sheets

ALL-OPTICAL GENERATION OF 60 GHZ MILLIMETER WAVE USING MULTIPLE WAVELENGTH BRILLOUIN-ERBIUM FIBER LASER

This application is a U.S. national stage of International Application No. PCT/MY2010/000210 filed Oct. 15, 2010.

FIELD OF THE INVENTION

This invention relates to a system for generating a millimeter wave signal. More particularly, this invention relates to a system that generates a millimeter wave signal from a multi-wavelength signal received from a Brillouin-Erbium Fiber Laser. Still more particularly, this invention relates to a configuration of a Brillouin-Erbium Fiber laser that generates a signal with multiple wavelengths using Stokes signals that may be heterodyned to generate a millimeter wave signal.

SUMMARY OF THE PRIOR ART

It is known that millimeter-wave carriers are a suitable candidate as the carrier for radio over fiber communications. Typically, a millimeter-wave signal is generated by direct modulation; external modulation; remote up and down conversion; or heterodyning of optical signals. However, the use of direct modulation; external modulation; and remote up and down conversion requires high frequency signal generators (electrical oscillators) that are prohibitively expensive. Therefore, heterodyning is the preferred method for generating a millimeter-wave signal.

However, heterodyning involves the mixing of two oscillating source signals (lasers) at a photo-detector such as a photodiode. The mixing of these two source signals in the photodiode creates signals with new frequencies; one is the sum of the two frequencies mixed; the other is the difference between the two frequencies. One manner of providing two source signals is to use a multi-wavelength laser source. One type of laser that can produce multiple wavelengths is a Brillouin-Erbium fiber laser as described in the article titled "Brillouin/Erbium Fiber Lasers" by Cowle et al. published in the Journal of Lightwave Technology, Vol. 15, no. 7, Jul. 1997 and U.S. Pat. No. 6,621,619 issued on 16 Sep. 2003 to Stutz et. al. However, the problem associated with the use of a Brillouin-Erbium laser is that the multiple wavelengths that are produced due to a Brillouin Stokes shift are only separated by a spacing of approximately 10 GHz. The 10 GHz spacing between wavelengths makes designing an appropriate filter problematic, as the filter response requires steep roll-offs at both left and right skirts. Thus, there is a need in the art for a Brillouin-Erbium laser that can provide a signal with multiple wavelengths with a wider spacing to allow the multiple wavelengths to be heterodyned to produce millimeter-wave signals.

SUMMARY OF THE INVENTION

The above and other problems are solved and an advance in the art is made by a system for generating a millimeter-wave signal using a Brillouin-Erbium fiber laser in accordance with this invention. A first advantage of this invention is that a signal with multiple wavelengths may be generated with a greater spacing between the wavelengths. A second advantage of this invention is that the use of a laser in accordance with this invention allows for the heterodyning of signals to produce millimeter-wave signals eliminating the need of expensive signal generators.

In accordance with this invention, a Brillouin-Erbium fiber laser is configured in the following manner. A source laser that continuously transmits a seed signal is connected to an input of an optical directional coupler. The optical directional coupler has a first input that receives the seed signal from the source laser and a first output. An Erbium doped fiber amplifier has an input connected to the first output of the optical directional coupler and an output. The Erbium doped fiber amplifier amplifies the seed signal received at the input.

A four-port circulator has a first port that receives the seed signal from the Erbium doped fiber amplifier. A Brillouin gain medium is connected to a second port and third port of the circulator. Thus, the seed signal propagates through the Brillouin gain medium in a first direction from the second port to the third port and a Stokes signal, generated when the seed signal power exceeds the Brillouin threshold of the medium, propagates through the Brillouin gain medium in a second direction from the third to the second port. A second order Stokes signal is then generated when the first order Stokes signal power exceeds the Brillouin threshold of the medium and propagates in the first direction in the same direction as the seed signal.

A fourth port of the four-port circulator is connected to a second input of the optical directional coupler. The fourth port applies the second order Stokes signal to the optical directional coupler. The optical directional coupler then receives the combined seed signal and the second order Stokes signal from the fourth port of the circulator and outputs a portion of the combined signal to the first output and a second portion of the combined signal to a second output.

In accordance with some embodiments of this invention, the Erbium doped fiber amplifier includes a laser diode to amplify the seed signal. In accordance with some particular embodiments, the laser diode is a 1480 nm laser diode.

In accordance with some embodiments of this invention, the Brillouin gain medium is dispersion compensated fiber. In accordance with particular embodiments, the Brillouin gain medium includes 15 kilometers of dispersion compensated fiber.

In accordance with some embodiments of this invention, a photodiode is connected to the second output of the optical directional coupler to heterodyne signals received from the second output. In accordance with some of these embodiments, the photodiode is a high-speed photodiode. In accordance with particular ones of these embodiments, an electrical spectrum analyzer receives heterodyned signals from the photodiode. In accordance with still further of these embodiments, at least one fiber Bragg grating may be connected between the second output of the optical directional coupling and the photodiode. In accordance with some of these further embodiments, an isolator may be connected prior to each fiber Bragg grating.

BRIEF DESCRIPTION OF THE DRAWINGS

The above and other features and advantages of a system in accordance with this invention are described in the following detailed description and are illustrated in the following drawings.

DETAILED DESCRIPTION

This invention relates to a system for generating a millimeter wave signal. More particularly, this invention relates to a system that generates a millimeter wave signal from a seed signal received from a Brillouin-Erbium Fiber Laser. Still more particularly, this invention relates to a configuration of a Brillouin-Erbium Fiber laser that generates signals with differing wavelengths based on the generation of even order Stokes signals to provide a signal with multiple wavelengths that may be heterodyned to generate a millimeter wave signal.

Figure 1:
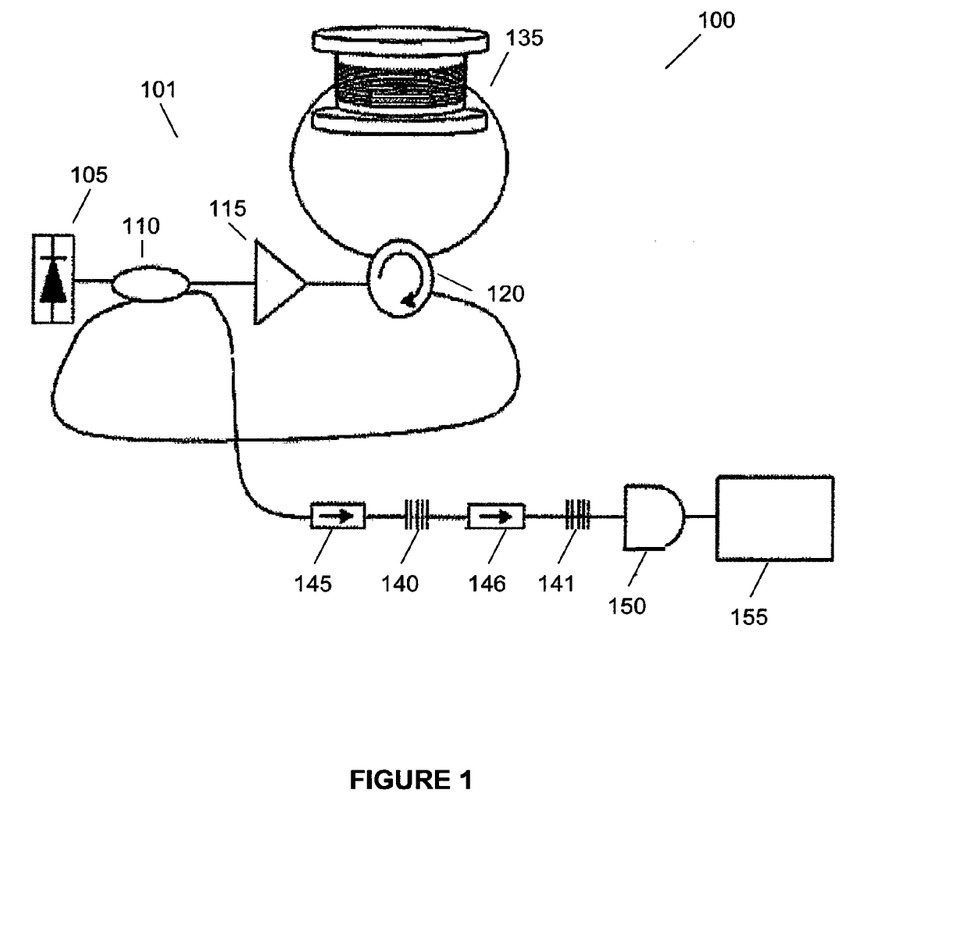
FIG. 1 illustrating a system for generating a millimeter-wave signal in accordance with one embodiment of this invention.

FIG. 1 illustrates a system for generating a millimeter wave signal by heterodyning a multi-wavelength signal from a Brillouin-Erbium fiber laser in accordance with an embodiment of the invention. System 100 includes Brillouin-Erbium fiber laser 101 that outputs a signal with multiple wavelengths; and photodiode 150 that receives and heterodynes the multi-wavelength signal to produce a millimeter wave signal. Brillouin-Erbium fiber laser 101 is configured to generate a signal with differing wavelengths. In accordance with this invention, Brillouin-Erbium fiber laser 101 is configured to produce a multi-wavelength signal with a spacing of 20 GHz between each wavelength to ease the filtering of the signals by providing 0.48 nm suppression band for 60 GHz spacing between the signals to create a 60 GHz signal when the signals from laser 101 are heterodyned. One skilled in the art will recognize that the bandwidth of the notch filter may be altered to provide a different spacing between the heterodyned wavelengths of the signal to produce different millimeter wave signals without departing from this invention.

In the embodiment shown in FIG. 1, Brillouin-Erbium fiber laser 101 includes laser source 105, optical directional coupler 110, Erbium-doped fiber amplifier 115, four-port circulator 120, and dispersion compensated fiber 135; and is configured in the following manner. Laser source 105 is connected to a first input of optical directional coupler 110 and provides a seed signal. Optical directional coupler 110 has a first input, a second input, a first output, and a second output. Preferably, optical directional coupler 110 is a 90/10 optical directional coupler in which 90% of the signals from the first input and 10% of the signals from the second input are applied to the first output. The second output provides signals received from the second input. However, it is envisioned that optical directional couplers with various power-dividing ratios may be used without departing from this invention.

The first output of optical directional coupler 110 is connected to an input of Erbium-doped fiber amplifier 115. The second output of optical directional coupler 110 provides the output of Brillouin-Erbium laser 101. Erbium-doped fiber amplifier 115 amplifies the received signal. Preferably, Erbium-doped fiber amplifier 115 is pumped by a 1480 nm laser diode. However, laser diodes with different wavelengths may be used without departing from this invention. The output of Erbium-doped fiber amplifier 115 is connected to a first port of four-port circulator 120.

Four-port circulator 120 is a typical circulator. A first port of four-port circulator 120 is connected to the output of Erbium-doped fiber amplifier 115. The second and third ports of four-port circulator 120 are connected to opposing ends of dispersion compensated fiber 135. Dispersion compensated fiber 135 acts as a Brillouin gain medium in Brillouin-Erbium laser 101. In the shown embodiment, dispersion compensated fiber 135 is 15 Km long. However, one skilled in the art will recognize that the length will depend on the material used and is left as a design choice to those skilled in the art. A fourth port of four-port circulator 120 is connected to a second input of optical directional coupler 110.

The second output of optical directional coupler 110 is connected to photodiode 150. Photodiode 150 performs the heterodyning of the signals. Preferably, photodiode 150 is a high speed photodiode. At least one Fiber Bragg gratings 140, 141 is cascaded between the second output of optical directional coupler 110 and photodiode 150. Fiber Bragg gratings 140, 141 form a notch filter for removing undesired wavelengths from the signal output from optical directional coupler 110. In the shown embodiment, two identical Fiber Bragg gratings are cascaded together to achieve the desired suppression level. The exact number of Fiber Bragg gratings required will depend on the output frequency, the desired suppression level and the desired millimeter wave signal to be produced and are, thus left as a design choice left to those skilled in the art. Isolators may be inserted prior to each of fiber Bragg gratings 140, 141 to prevent signals from being reflected by gratings 140, 141.

In accordance with the shown embodiment of this invention, system 100 operates in the following manner. Laser source 105 generates a continuous seed signal. Optical directional coupler 110 receives the seed signal from the first input and applies 90% of the seed signal to the first output. Erbium-doped fiber amplifier 115 receives the signal from the first output and amplifies the received signal. Preferably, the signal is pumped by a 1480 nm laser diode. The amplified signal is then applied to a first port of four-port circulator 120. The signal is then applied to dispersion compensated fiber 135 through four-port circulator 120. Dispersion compensated fiber 135 acts a Brillouin gain medium and generates a first order Stokes signal that is 10 GHz downshifted from the received signal, once the received signal exceeds the Brillouin threshold of dispersion compensated fiber 135.

The first order Stokes signal propagates in the opposite direction of the received signal and is fed back to the other end of the fiber through the second and third ports of four-port circulator 120. The first order Stokes signal acts as a Brillouin pump from the other end of fiber and as the first order Stokes signal circulates and oscillates through dispersion compensated fiber 135, the first order Stokes signal is amplified through a Brillouin amplification process. A second order Stokes signal that is downshifted twice the Brillouin shift (approximately 20 GHz) from the received signal is then generated when the first order Stokes signal exceeds the Brillouin threshold. The second order Stokes signal propagates through dispersion compensated fiber 135 in the same direction as the original received signal. The second order Stokes signal is then output by the fourth port of four-port circulator 120.

Figure 3:
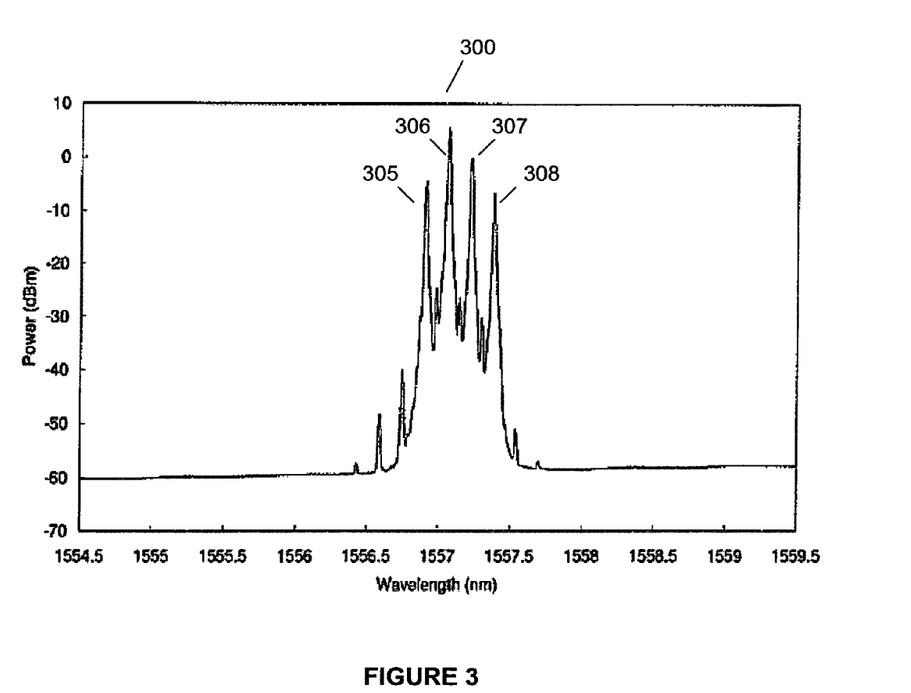
FIG. 3 illustrating a graph of the multi-wavelength output of a Brillouin-Erbium fiber laser in accordance with the embodiment of the invention shown in FIG. 1.

The second order Stokes signal from the fourth port of four-port circulator 120 is then applied to the second input of optical directional coupler 110. Optical directional coupler 110 then applies 10% of the signal to Erbium-doped fiber amplifier 115. The process is then repeated with the amplified combined signal acting as the 'seed signal' to produce an output signal with additional higher even order Stokes signals. In this manner, a signal with multiple wavelengths having a spacing of approximately 20 GHz between each wavelength is generated. The output of laser 101 is shown in FIG. 3 in graph 300 that shows a signal with multiple wavelengths, 305-308, which are approximately 20 GHz apart being generated. One skilled in the art will recognize that the number of even order Stokes signals generated can be controlled by adjusting the pump power of Erbium-doped fiber amplifier 115. Further, one skilled in the art will recognize that the number of differing wavelengths generated will be determined by the desired millimeter wave signal to be produced in the manner described below.

Figure 2:
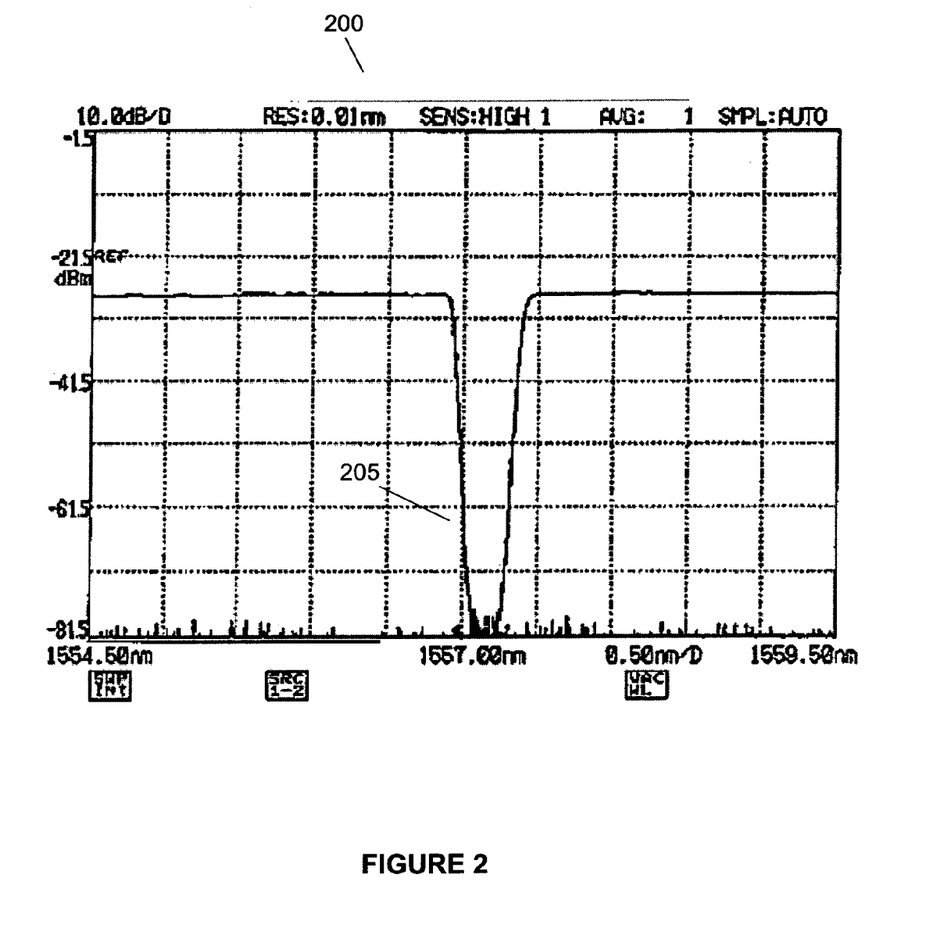
FIG. 2 illustrating a graph of a transmission spectrum of an optical notch filter in accordance with the embodiment of the invention shown in FIG. 1.
Figure 4:
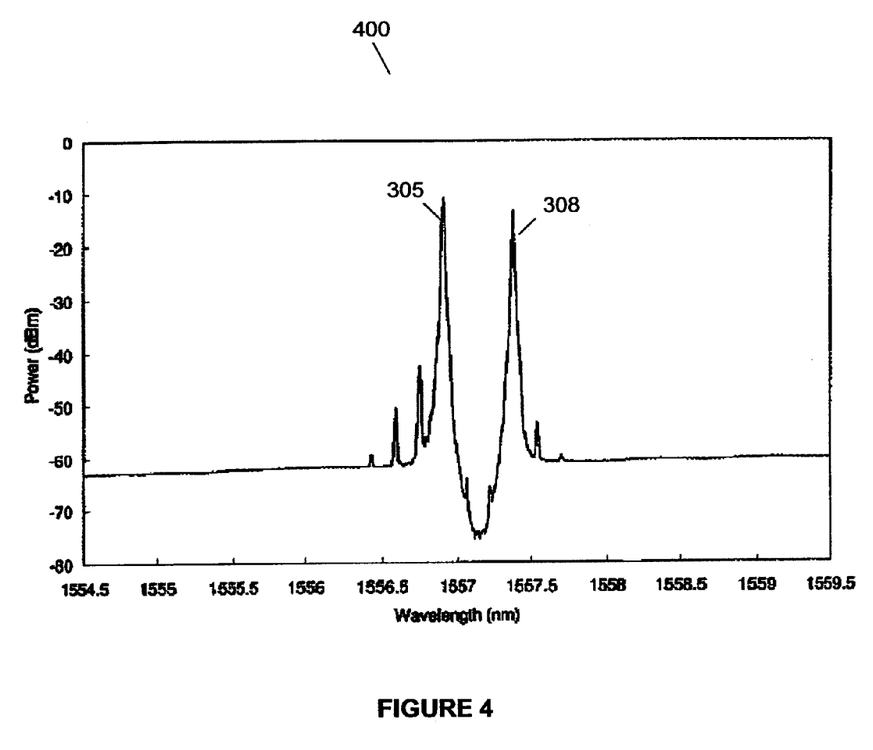
FIG. 4 illustrating a graph of the filtered multi-wavelength signal of the system of the embodiment in accordance with this invention shown in FIG. 1.
Figure 5:
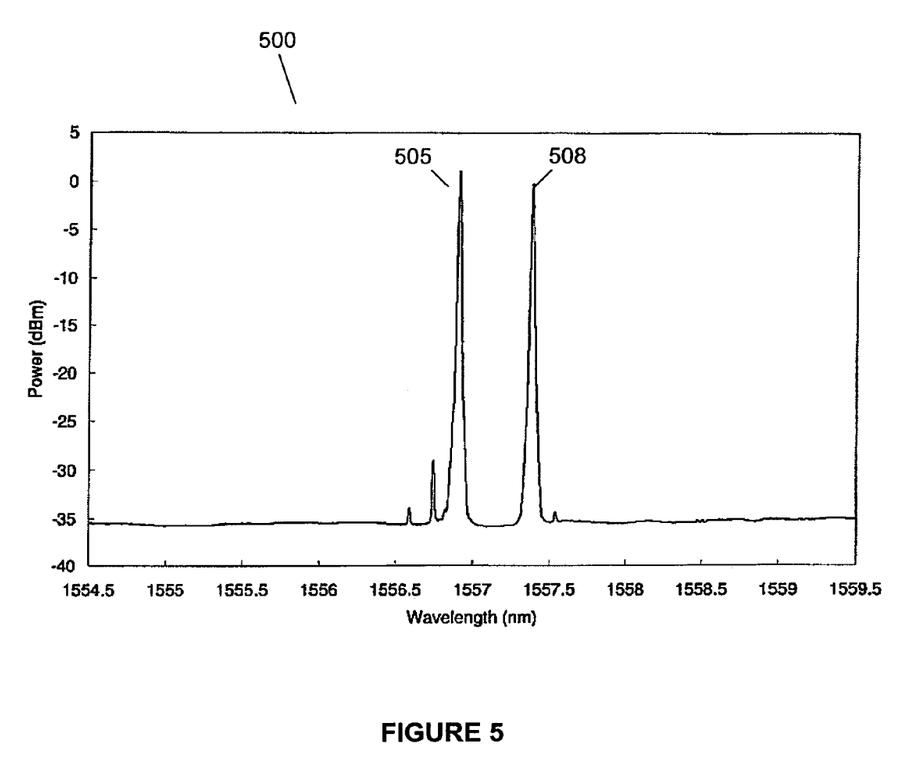
FIG. 5 illustrating a graph of an amplified and filtered output of the Brillouin-Erbium fiber laser to be heterodyned in accordance with the embodiment shown in FIG. 1.

The output from the second output of optical directional coupler 110 is then directed through at least one of fiber Bragg gratings 140, 141 which act as a notch filter to remove the 'wavelengths' that are not needed for heterodyning. FIG. 2 illustrates the filter response 205 of the notch filter. FIG. 4 then illustrates graph 400 after the output has passed through fiber Bragg gratings 140, 141 in which wavelengths 306 and 307 (shown in FIG. 3) are filtered out and wavelength 305 (the Brillouin pump) and wavelength 308 (the sixth order Stokes signal) remain. The resulting amplified signals are shown in graph 500 in FIG. 5 in which wavelengths 505 and 508 are amplified wavelengths 305 and 308 respectively.

Figure 6:
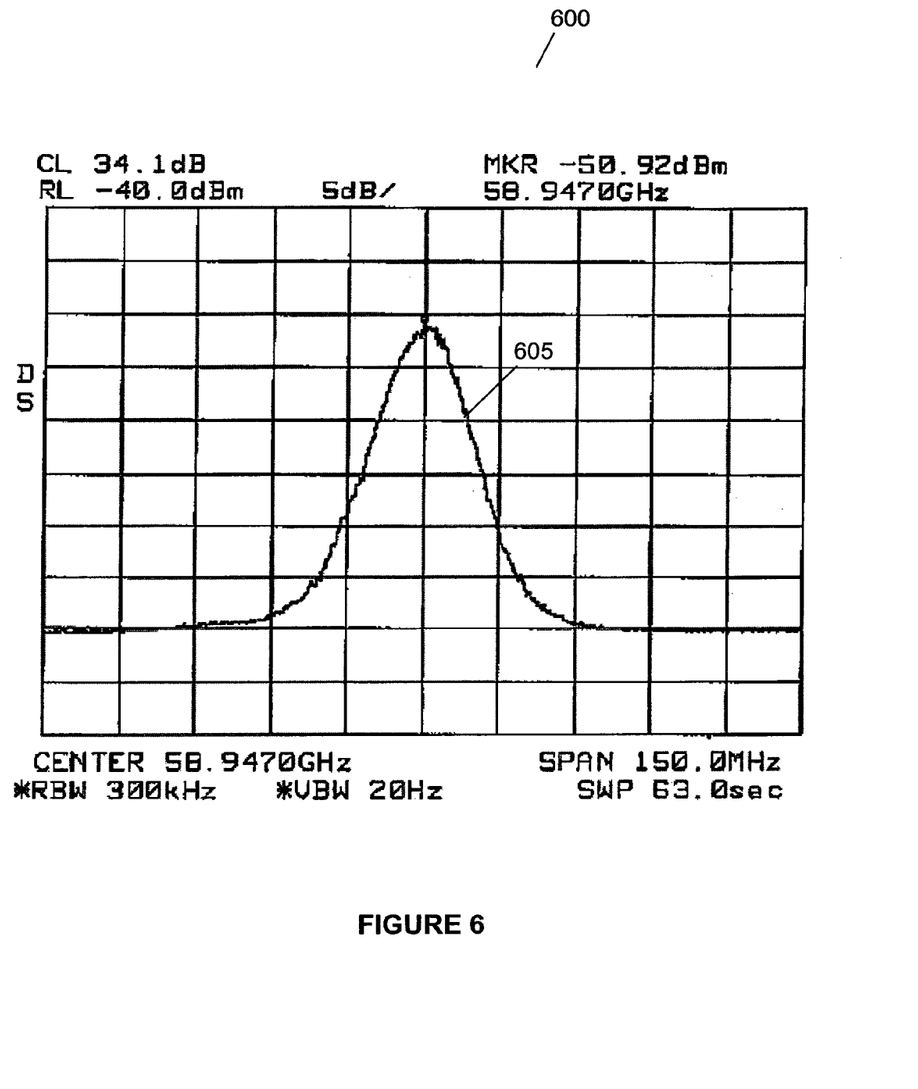
FIG. 6 illustrating a graph of a heterodyned output signal in accordance with the embodiment shown in FIG. 1.

The resulting multi-wavelength signal is then received by photodiode 150 and heterodyned to produce a signal with new frequencies; one is the sum of the two frequencies mixed; the other is the difference between the two frequencies, i.e. the millimeter wave signal. In accordance with this embodiment, the Brillouin pump and an sixth order Stokes signal are heterodyned. As the wavelengths are approximately 60 GHz apart, the result is a millimeter wave signal 605 centered at 60 GHz as shown in graph 600 in FIG. 6. One skilled in the art will recognize that a different spacing between the wavelengths may be used to change the difference between the generated even order Stokes signals and hence the center frequency of the resulting millimeter wave signal. The resulting signal may then be measured by electrical spectrum analyzer 155 connected to the output of photodiode 150.

The above is a description of an embodiment of the system in accordance with this invention. It is expected that those skilled in the art can and will design alternative embodiments of this invention as set forth in the following claims.

What is claimed is:

1. A system for generating a millimeter wave signal (100) comprising:
   a Brillouin-Erbium fiber laser (101) including:
   a source laser (105) for transmitting a seed signal;
   an optical directional coupler (110) having a first input that receives said seed signal from said source laser and a first output;
   an Erbium doped fiber amplifier (115) having an input connected to said first output of said optical directional coupler and an output wherein said Erbium doped fiber amplifier amplifies said seed signal;
   a four port circulator (120) having a first port that receives said seed signal from said Erbium doped fiber amplifier;
   a Brillouin gain medium (135) connected to a second port and third port of said circulator, wherein said seed signal propagates through said Brillouin gain medium in a first direction and a first order Stokes signal propagates through said Brillouin gain medium in a second direction to generate a second order Stokes signal propagating in said first direction;
   a fourth port of said circulator connected to a second input of said optical directional coupler wherein said optical directional coupler receives said signal from said fourth port of said circulator and outputs a portion of said signal to a first output and a second portion to a second output of said optical directional coupler; and
   a first isolator having a first end connected to said second output of said optical directional coupler, said first isolator having a second end connected to a first end of a first fiber Bragg grating, wherein said fiber Bragg grating reflects second-order and fourth-order Stokes signals, and wherein said reflected Stokes signals are absorbed by said first isolator.

2. The system of claim 1 wherein said Erbium doped fiber amplifier (115) comprises:
   a laser diode for pumping said signal.

3. The system of claim 2 wherein said laser diode is a 1480 nm laser diode.

4. The system of claim 1 wherein said Brillouin gain medium (135) comprises:
   a dispersion compensated fiber (135).

5. The system of claim 4 wherein said dispersion compensated fiber (135) comprises:
   15 kilometers of dispersion compensated fiber (135).

6. The system of claim 1 further comprising:
   a photodiode (150) connected to a second end of said first fiber Bragg grating to heterodyne signals from said second output.

7. The system of claim 6 wherein said photodiode (150) is a high speed photodiode.

8. The system of claim 6 further comprising:
   an electrical spectrum analyzer (155) that receives heterodyned signals from said photodiode.

9. The system of claim 1 further comprising:
   a second isolator having a first end connected to a second end of said first fiber Bragg grating.

10. The system of claim 9 wherein said second isolator further comprises a second end connected to a first end of a second fiber Bragg grating.

11. The system of claim 10 further comprising:
    a photodiode (150) connected to a second end of said second fiber Bragg grating to heterodyne signals from said second output of said optical directional coupler.

12. A method for millimeter-wave signal generation by heterodyning a multi-wavelength signal generated by a Brillouin-Erbium fiber laser comprising:
    generating a seed signal with a laser source (105);
    directing said seed signal to an Erbium-doped fiber amplifier (115) through an optical directional coupler (120);
    amplifying said seed signal in said Erbium-doped fiber amplifier (115) resulting in an amplified seed signal;
    applying said amplified seed signal to a Brillouin gain medium (135);
    generating a first order Stokes signal responsive to power of said amplified seed signal exceeding power of a Brillouin threshold of said Brillouin gain medium;
    applying said first order Stokes signal to a second end of said Brillouin gain medium through a four port circulator (120) to cause said first order Stokes signal to propagate through said Brillouin gain medium in an opposite direction of said seed signal;
    generating a second order Stokes signal responsive to power of said first order Stokes signal exceeding said Brillouin threshold of said Brillouin gain medium wherein said second order Stokes signal is propagating though said Brillouin gain medium in a same direction of said amplified seed signal and mixes with said amplified seed signal to generate a down converted wavelength;

applying said down converted wavelength signal to said optical directional coupler through said four port circulator;

providing a portion of said down converted wavelength to said Erbium-doped fiber amplifier from said optical directional coupler to provide a plurality of subsequent down converted wavelengths;

providing a second portion of said down converted wavelength to an output;

providing a first fiber Bragg grating at said output to reflect second-order and fourth-order Stokes signals; and providing a first isolator prior to said first fiber Bragg grating to absorb said reflected second-order and fourth-order Stokes signals.

13. The method of claim 12 wherein spacing between said down converted wavelengths is spaced 20 GHz apart.

14. The method of claim 12 further comprising:
providing a second isolator and a second fiber Bragg grating at the output of said first fiber Bragg grating.

15. The method of claim 12 further comprising:
heterodyning said down converted wavelengths with a high speed photodiode (150).

16. The method of claim 15 further comprising:
measuring a signal resulting from said heterodyning with an electrical spectrum analyzer (155).

17. The method of claim 15 wherein a 60 GHz signal is generated from an output of said down converted wavelength and one of said plurality of subsequent down converted wavelengths heterodyned by said photodiode.

\* \* \* \* \*

UNITED STATES PATENT AND TRADEMARK OFFICE
CERTIFICATE OF CORRECTION

| | | |
|---|---|---|
| PATENT NO. | : 8,687,659 B2 | Page 1 of 1 |
| APPLICATION NO. | : 13/634581 | |
| DATED | : April 1, 2014 | |
| INVENTOR(S) | : Asmahanim bte Ahmad | |

It is certified that error appears in the above-identified patent and that said Letters Patent is hereby corrected as shown below:

Title page, item (22), change "Nov." to -- Oct. --.

In the Specification

Column 1, line 43, change "Stutz" to -- Strutz --.

Signed and Sealed this
Twenty-third Day of December, 2014

Michelle K. Lee
*Deputy Director of the United States Patent and Trademark Office*